US012777097B2

(12) United States Patent
Jagannathan

(10) Patent No.: US 12,777,097 B2
(45) Date of Patent: Oct. 27, 2026

(54) SYSTEMS AND METHODS FOR IMPLEMENTING NEAR-FIELD COMMUNICATION FOR COMMUNICATION DEVICE SERVICING

(71) Applicant: BOOST SUBSCRIBERCO L.L.C., Englewood, CO (US)

(72) Inventor: Thiruvengadam Jagannathan, Plano, TX (US)

(73) Assignee: BOOST SUBSCRIBERCO L.L.C., Englewood, CO (US)

(*) Notice: Subject to any disclaimer, the term of this patent is extended or adjusted under 35 U.S.C. 154(b) by 182 days.

(21) Appl. No.: 18/733,353

(22) Filed: Jun. 4, 2024

(65) Prior Publication Data

US 2025/0373698 A1 Dec. 4, 2025

(51) Int. Cl.

*H04L 67/133* (2022.01)
*H04B 5/43* (2024.01)
*H04B 5/77* (2024.01)

(52) U.S. Cl.

CPC ............ *H04L 67/133* (2022.05); *H04B 5/43* (2024.01); *H04B 5/77* (2024.01)

(58) Field of Classification Search

CPC ........... H04L 67/133; H04B 5/43; H04B 5/77; H04B 5/20

See application file for complete search history.

(56) References Cited

U.S. PATENT DOCUMENTS 10,909,525 B1 * 2/2021 Dhodapkar ........ G06Q 20/3278
2017/0019265 A1 * 1/2017 Hou ...................... H04W 12/08
2019/0373432 A1 * 12/2019 Gabriele ................ H04W 4/80

OTHER PUBLICATIONS

"How to Activate Capital One Credit Card App?", YouTube.com Video, posted by Slava-Money on Dec 2, 2023, accessed Mar. 12, 2024, 6 pages.

Capital One, "The Capital One Mobile App, Get the Capital One Mobile app, Monitor your money on the go and keep confidence close at hand", capitalone.com/digital/mobile, 7 pages, accessed Mar. 12, 2024.

(Continued)

*Primary Examiner* — Fayyaz Alam

(74) *Attorney, Agent, or Firm* — Quarles & Brady, LLP

(57) ABSTRACT

Systems and methods are provided for implementing near-field communication (NFC) for communication device servicing. One system includes a communication device having an antenna and a processor. The processor may output, via the antenna, a request radio frequency (RF) signal to a NFC tag. The processor may receive, via the antenna, a response RF signal including data embedded on the NFC tag. The processor may determine an identifier associated with the communication device and generate and transmit a request to a remote device, the request including the identifier associated with the communication device. The processor may receive, from the remote device, a data packet including a recommended operation. The processor may output the recommended operation and detect a selection of the recommendation operation. Responsive to the selection, the processor may cause the remote device to execute the recommended operation.

20 Claims, 8 Drawing Sheets

(56) References Cited

OTHER PUBLICATIONS

Capital One, What Are NFC Mobile Payments?, What are near-field communication (NFC) payments?, capitalone. com/learn-grow/money-management/nfc-payments/ Nov. 8, 2023, 7 pages.

Capital One, Activate your new card, Let's get your new Capital One credit card ready to use. accessed Mar. 8, 2024, capitalone. com/help-center/card-activation/activate-your-new-card, 8 pages.

* cited by examiner

SYSTEMS AND METHODS FOR IMPLEMENTING NEAR-FIELD COMMUNICATION FOR COMMUNICATION DEVICE SERVICING

BACKGROUND

This disclosure relates to near-field communication ("NFC"). NFC generally includes a set of communication protocols enabling short-range wireless communication between electronic devices. NFC enables the sharing of small payloads of data between electronic devices, including, e.g., between an NFC tag and a communication device or between multiple communication devices.

The discussion above is merely provided for general background information and is not intended to be used as an aid in determining the scope of the claimed subject matter.

SUMMARY

This disclosure is in the field of near-field communication ("NFC"), and more particularly, in the field of implementing NFC for communication device servicing.

Some telecommunication users may be hindered by restrictions that prevent or limit such users from participating in in-person telecommunication support services, such as, e.g., wireless retail customer onboarding, provisioning, payment, service, care, etc. For instance, telecommunication users challenged with disabilities, such as blindness, autism, a physical impairment, etc., may be restricted or limited in their ability to travel to a telecommunication building, such as a retail store, in order to seek telecommunication support services.

The technology disclosed herein enables support and inclusion of all customers to self-manage their telecommunication services by providing methods and systems that advantageously implement NFC for communication device servicing, and, in some instances, provide braille support through the inclusion of braille on one or more NFC-enabled devices (e.g., NFC tags). Additionally, the technology disclosed herein advantageously improves efficiency and costs incurred by a customer for reaching a provider or carrier.

Accordingly, the technology disclosed herein may provide a solution to such challenges and problems. One configuration may provide a communication device. The communication device may include a reader having an antenna. The communication device may include one or more electronic processors in communication with the antenna of the reader. The one or more electronic processors may be configured to output, via the antenna, a request radio frequency (RF) signal to an external near-field communication (NFC) tag. The one or more electronic processors may be configured to receive, via the antenna, a response RF signal from the external NFC tag responsive to the request RF signal, the response RF signal including data embedded on the NFC tag. The one or more electronic processors may be configured to, responsive to receipt of the response RF signal, determine an identifier associated with the communication device; and generate and transmit a request to a remote device, the request including the identifier associated with the communication device. The one or more electronic processors may be configured to receive, from the remote device, a data packet responsive to the request, the data packet including a first recommended operation for the communication device. The one or more electronic processors may be configured to output, via a display device of the communication device, the first recommendation operation. The one or more electronic processors may be configured to detect a selection of the first recommendation operation. The one or more electronic processors may be configured to, responsive to the selection, cause the remote device to execute the first recommended operation.

Another configuration may provide a system. The system may include a near-field communication (NFC) tag including a first antenna configured to facilitate short-range wireless communication. The system may include a communication device. The communication device may include a second antenna configured to engage in short-range wireless communication with the first antenna of the NFC tag. The communication device may include one or more electronic processors in communication with the second antenna. The one or more electronic processors may be configured to receive, via the second antenna, an NFC signal from the NFC tag. The one or more electronic processors may be configured to, responsive to receipt of the NFC signal, compile a first data packet including an identifier associated with the communication device and a request for one or more recommended operations to be performed with respect to the communication device. The one or more electronic processors may be configured to transmit the first data packet to a remote device. The one or more electronic processors may be configured to receive, from the remote device, a second data packet including a plurality of recommended operations to be performed with respect to the communication device. The one or more electronic processors may be configured to output, using an application of the communication device, the plurality of recommended operations to a user via a display device of the communication device. The one or more electronic processors may be configured to detect, based on an interaction with the application of the communication device, a selection of a recommended operation of the plurality of recommended operations. The one or more electronic processors may be configured to, responsive to detecting the selection of the recommended operation, cause performance of the recommended operation with respect to the communication device.

Yet another configuration may provide a method. The method may include receiving, with one or more electronic processors, from a communication device, a first data packet generated responsive to an interaction between the communication device and a near-field communication (NFC) tag, the first data packet including an identifier and a request for a plurality of recommended operations for the communication device. The method may include executing, with the one or more electronic processors, a database query to retrieve data based on the identifier included in the first data packet. The method may include determining, with the one or more electronic processors, the plurality of recommended operations for the communication device based on the data retrieved by execution of the database query. The method may include compiling, with the one or more electronic processors, a second data packet, the second data packet including the plurality of recommended operations for the communication device. The method may include transmitting, with the one or more electronic processors, the second data packet to the communication device. The method may include receiving, with the one or more electronic processors, a selection of a recommended operation of the plurality of recommended operations. The method may include, responsive to receiving the selection, controlling, with the one or more electronic processors, execution of the recommended operation with respect to the communication device.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

The following drawings are provided to help illustrate various features of examples of the disclosure and are not intended to limit the scope of the disclosure or exclude alternative implementations.

DETAILED DESCRIPTION OF THE PRESENT DISCLOSURE

Figure 1:
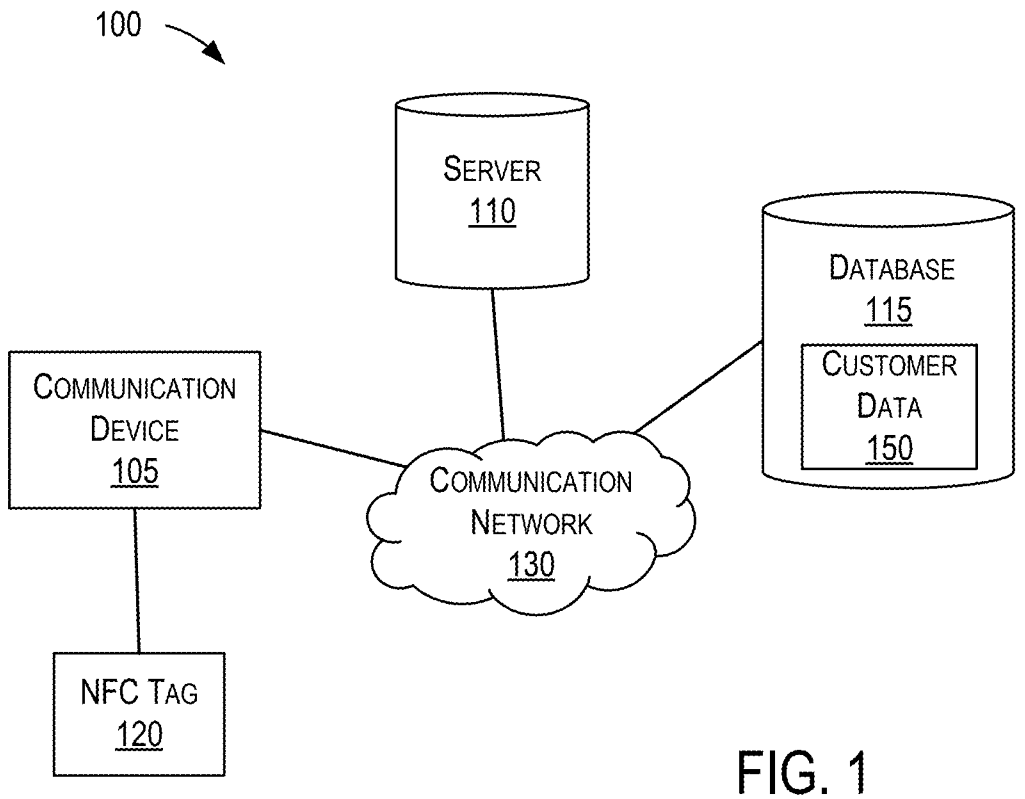
FIG. 1 schematically illustrates a system for implementing NFC for communication device servicing according to some configurations.

The disclosed technology is not limited in its application to the details of construction and the arrangement of components set forth in the following description or illustrated in the following drawings. Other examples of the disclosed technology are possible and examples described and/or illustrated here are capable of being practiced or of being carried out in various ways. The terminology in this document is used for the purpose of description and should not be regarded as limiting. Words such as "including," "comprising," and "having" and variations thereof as used herein are meant to encompass the items listed thereafter, equivalents thereof, as well as additional items.

A plurality of hardware and software-based devices, as well as a plurality of different structural components can be used to implement the disclosed technology. In addition, examples of the disclosed technology can include hardware, software, and electronic components or modules that, for purposes of discussion, can be illustrated and described as if the majority of the components were implemented solely in hardware. However, in at least one example, the electronic based aspects of the disclosed technology can be implemented in software (for example, stored on non-transitory computer-readable medium) executable by one or more electronic processors. Although certain drawings illustrate hardware and software located within particular devices, these depictions are for illustrative purposes only. In some examples, the illustrated components can be combined or divided into separate software, firmware, hardware, or combinations thereof. As one example, instead of being located within and performed by a single electronic processor, logic and processing can be distributed among multiple electronic processors. Regardless of how they are combined or divided, hardware and software components can be located on the same computing device or can be distributed among different computing devices connected by one or more networks or other suitable communication links.

As noted herein, this disclosure is in the field near-field communication (NFC), and, more particularly, in the field of implementing NFC for communication device servicing.

The technology disclosed herein provides methods and systems that implement low-cost, contactless instruments, such as, e.g., NFC-enabled devices including magnets, tags, stickers, etc. Such NFC-enabled devices may be utilized by, e.g., new users who purchase a subscriber identity module (SIM) kit or mobile phone, which includes NFC technology or NFC tags directly from a communications service provider that has the ability to uniquely identify the customer from an application. In some instances, upon receiving a communication device, a user may install an application which supports passkeys (e.g., based on user biometrics) on the provisioned communication devices without having to perform any sign in on the communication device. Customers whose communication devices already have the application installed, when performing NFC tapping in the communication devices, the application (upon authenticated with passkeys or biometric authentication) may have the ability to uniquely identify a customer from an identifier of the NFC tag or electronic SIM (eSIM) profile of the customer. Once a user profile is identified, a recommended operation for the customer may be determined and, upon consent or selection of the recommended operation, the selected operation may be performed. The recommended operation may also be referred to as a next best action for the customer.

A particular recommended operation may vary depending on a user type and other user information. For example, a next best action for new customers may include, upon scanning an NFC tag, activating their service or installing an eSIM, for existing customers, upon tapping, an existing customer may choose to pay for their services, for either new or existing customers, upon tapping, can request for callback from a customer service or to be able to place a call directly to the customer care.

In some configurations, a recommended operation may be advantageously determined using artificial intelligence or machine learning without labeling or identifying a customer.

FIG. 1 illustrates a system 100 for implementing NFC for communication device servicing according to some configurations. In the illustrated example, the system 100 includes a communication device 105, a server 110, a database 115, and an NFC tag 120. In some configurations, the system 100 includes fewer, additional, or different components than illustrated in FIG. 1 in different configurations. As one example, the system 100 may include multiple communication devices 105, multiple servers 110, multiple databases 115, multiple NFC tags 120, or a combination thereof. As another example, one or more components of the system 100 may be combined into a single device. For instance, in some examples, server 110 and the database 115 may be combined into a single component of the system 100.

The communication device 105, the server 110, the database 115, and the NFC tag 120 may communicate over one or more wired or wireless communication networks 130. Portions of the communication networks 130 may be implemented using a wide area network (WAN), such as the Internet, a local area network (LAN), such as a Bluetooth™ network or Wi-Fi, and combinations or derivatives thereof. Alternatively, or in addition, in some configurations, components of the system 100 communicate directly as compared to through the communication network 130. For example, as illustrated in FIG. 1, in some configurations, the communication device 105 and the NFC tag 120 may communicate directly. In such configurations, the communication device 105 and the NFC tag 120 may communicate via NFC, as described in greater detail herein. As another example, in some configurations, the server 110 and the database 115 may communicate directly. Also, in some configurations, the components of the system 100 may communicate through one or more intermediary devices not illustrated in FIG. 1.

The communication device 105 may include a computing device that interfaces with a user. For instance, the communication device 105 may include various types of end-user devices, such as, e.g., a cellular phone, a smartphone, a tablet, or any computerized device capable of communicating via a cellular network.

Figure 2:
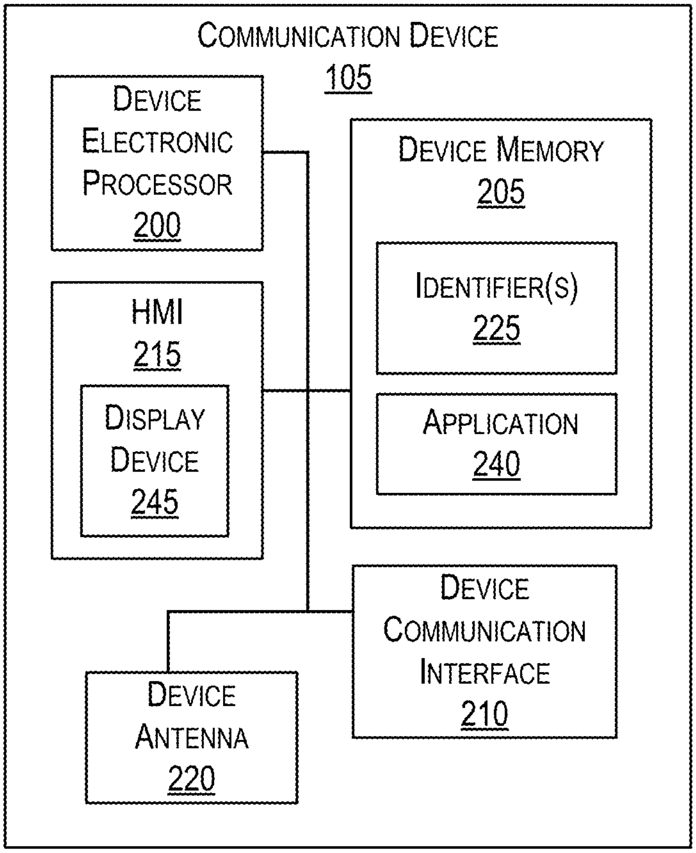
FIG. 2 schematically illustrates a communication device included in the system of FIG. 1 in accordance with some configurations.

FIG. 2 schematically illustrates an example communication device 105 according to some configurations. As illustrated in FIG. 2, the communication device 105 includes a device electronic processor 200, a device memory 205, a device communication interface 210, a human-machine interface (HMI) 215, and a device antenna 220. The device electronic processor 200, the device memory 205, the device communication interface 210, the HMI 215, and the device antenna 220 may communicate wirelessly, over one or more communication lines or buses, or a combination thereof. The communication device 105 may include additional, different, or fewer components than those illustrated in FIG. 2 in various configurations. The communication device 105 may perform additional or different functionality than the functionality described herein. Also, the functionality (or a portion thereof) described herein as being performed by the communication device 105 may be performed by another component (e.g., the server 110, another component of the system 100, or a combination thereof), distributed among multiple devices (e.g., as part of a cloud service or cloud-computing environment), combined with another component (e.g., the server 110, another component of the system 100, or a combination thereof), or a combination thereof.

The device communication interface 210 may include a transceiver that communicates with the server 110, the database 115, the NFC tag 120, or a combination thereof over the communication network 130 and, optionally, one or more other communication networks or connections.

In some configurations, the communication device 105 may be an NFC-enabled device. Accordingly, in some configurations, the communication device 105 may implement short-range wireless connectivity technology (or wireless personal area network (PAN) technology) to communicate with another NFC-enabled device, such as, e.g., the NFC tag 120. In some examples, the communication device 105 may communicate with another NFC-enabled device (e.g., the NFC tag 120) via the device antenna 220. The device antenna 220 may include an NFC reader or other suitable component that enables implementation of NFC between NFC-enabled devices (e.g., the communication device 105 and the NFC tag 120). In some configurations, the device antenna 220 may be a separate component from the device communication interface 210, as illustrated in the example of FIG. 2. However, in some configurations, the device antenna 220 may be included as part of the device communication interface 210.

The device electronic processor 200 includes one or more processors (e.g., one or more microprocessors, one or more application-specific integrated circuits (ASICs), and/or one or more other suitable electronic device for processing data), and the device memory 205 includes a non-transitory, computer-readable storage medium. The device electronic processor 200 is configured to retrieve instructions and data from the device memory 205 and execute the instructions.

As illustrated in FIG. 2, the device memory 205 may store one or more identifiers 225. An identifier may include, e.g., an account identifier, a device identifier, a user identifier, etc. An account identifier may include information or data that identifies or describes a particular user account for a telecommunications carrier. For example, an account identifier may include an account number, a PIN number, a phone number, etc. A device identifier may include information or data that identifies or describes a particular communication device, such as, e.g., the communication device 105. For example, a device identifier may include a model, a version, a purchase date, a serial number, etc. A user identifier may include information or data that identifies or describes a particular user. For example, a user identifier may include a name, an address, a phone number, an email address, etc. A telecommunications carrier is a company that provides telecommunications services, and may also be referred to herein as telecommunications service provider, network carrier, provider, or carrier.

As illustrated in FIG. 2, the device memory 205 may include an application 240. The application 240 is a software application executable by the device electronic processor 200 in the example illustrated and as specifically discussed below, although a similarly purposed module can be implemented in other ways in other examples. In some configurations, the application 240 may be a dedicated software application locally stored in the device memory 205 of the communication device 105. As described in greater detail herein, the application 240 (when executed by the device electronic processor 200) may enable or facilitate communication device servicing.

The device memory 205 may include additional, different, or fewer components in different configurations. Alternatively, or in addition, in some configurations, one or more components of the device memory 205 may be combined into a single component, distributed among multiple components, or the like. Alternatively, or in addition, in some configurations, one or more components of the device memory 205 may be stored remotely from the communication device, or, in a remote database, server, a remote user device, an external storage device, or the like (e.g., the server 110, the database 115, etc.).

As illustrated in FIG. 2, the communication device 105 may include the HMI 215 for interacting with a user. The HMI 215 may include one or more input devices, one or more output devices, or a combination thereof. Accordingly, in some configurations, the HMI 215 allows a user to interact with (e.g., provide input to and receive output from) the communication device 105. For example, the HMI 215 may include a keyboard, a cursor-control device (e.g., a mouse), a touch screen, a scroll ball, a mechanical button, a display device (e.g., a liquid crystal display (LCD)), a printer, a speaker, a microphone, or a combination thereof. In the illustrated example of FIG. 2, the HMI 215 includes a display device 245. The display device 245 may be included in the same housing as the communication device 105 and may be, for example, a touchscreen.

Returning to FIG. 1, the system 100 may include the NFC tag 120. In some configurations, the NFC tag 120 may be an unpowered tag, such as, e.g., a sticker, a key fob, a card, a label, a smart poster, etc. Alternatively, in some configurations, the NFC tag 120 may be a powered tag.

Figure 3:
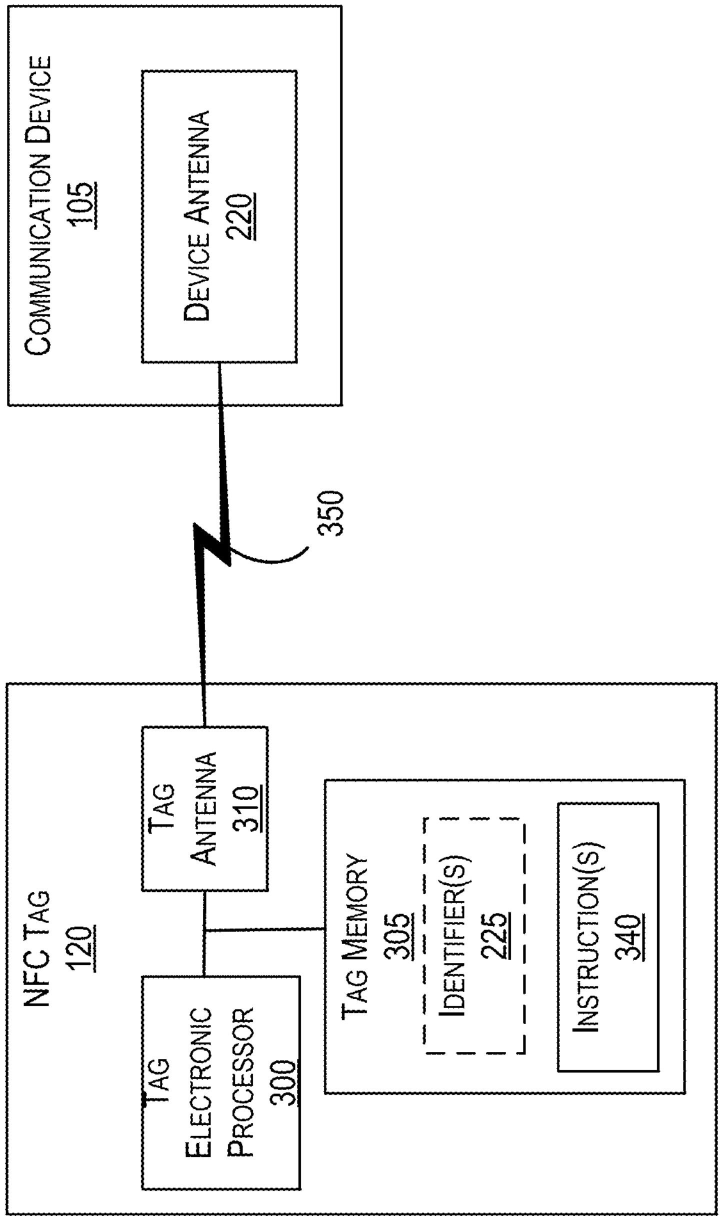
FIG. 3 schematically illustrates an NFC tag included in the system of FIG. 1 in accordance with some configurations.

FIG. 3 illustrates an example NFC tag 120 in accordance with some configurations. As illustrated in FIG. 3, the NFC tag 120 may include a tag electronic processor 300, a tag memory 305, and a tag antenna 310. The tag electronic processor 300, the tag memory 305, and the tag antenna 310 may communicate wirelessly, over one or more communication lines or buses, or a combination thereof. The NFC tag 120 may include additional, different, or fewer components than those illustrated in FIG. 3 in various configurations. The NFC tag 120 may perform additional or different functionality than the functionality described herein. Also, the functionality (or a portion thereof) described herein as being performed by the NFC tag 120 may be performed by another component, distributed among multiple devices, combined with another component, or a combination thereof.

The tag electronic processor 300 includes one or more processors (e.g., one or more microprocessors, one or more application-specific integrated circuits ("ASICs"), and/or one or more other suitable electronic device for processing data), and the tag memory 305 includes a non-transitory, computer-readable storage medium. In some configurations, the tag electronic processor 300 may retrieve instructions and data from the tag memory 305 and execute the instructions.

In some configurations, the NFC tag 120 may store (or otherwise contain) data. In some instances, the NFC tag 120 (e.g., the tag memory 305) may store a set of instructions 340 for initiating communication device servicing, as described herein. As one example, the NFC tag 120 may store instructions to launch an application or widget on the communication device 105 (e.g., the application 240). Alternatively, or in addition, in some configurations, the tag memory 305 may include one or more identifiers (e.g., the identifier(s) 225 of FIG. 2), including, e.g., an account identifier, a device identifier, a user identifier, etc.

As noted herein, in some configurations, the NFC tag 120 may be an NFC-enabled device. Accordingly, in some configurations, the NFC tag 120 may implement short-range wireless connectivity technology (or wireless PAN technology) to communicate with another NFC-enabled device, such as, e.g., the communication device 105. In some examples, the NFC tag 120 may communicate with another NFC-enabled device (e.g., the communication device 105) via the tag antenna 310. The tag antenna 310 may include an NFC reader or other suitable component that enables implementation of NFC between NFC-enabled devices (e.g., the communication device 105 and the NFC tag 120).

For example, as illustrated in FIG. 3, the tag antenna 310 may communicate with the device antenna 220 via an NFC link (represented in FIG. 3 by reference numeral 350), such that, e.g., the NFC tag 120 may provide data stored (or otherwise contained) in the tag memory 305 to the communication device 105. In some examples, the NFC link 350 may facilitate the transmission of the instruction(s) 340, the identifier(s) 225, or a combination thereof from the NFC tag 120 (via the tag antenna 310) to the communication device 105 (via the device antenna 220).

As described in greater detail herein, in some configurations, the communication device 105 may generate and transmit, via the device antenna 220, an NFC signal, such as, e.g., a radio frequency ("RF") signal or another suitable type of NFC communication signal, to the NFC tag 120 (e.g., as an NFC request signal). The NFC tag 120 may receive the NFC request signal via the tag antenna 310. Responsive to receiving the NFC request signal, the NFC tag 120 may transmit, via the tag antenna 310, an NFC signal that responds to the NFC request to the communication device 105 (e.g., as an NFC response signal). The NFC response signal may include the instruction(s) 340, the identifier(s) 225, or a combination thereof.

The NFC tag 120 may be a passive tag, an active (powered) tag, or a hybrid tag capable of both passive and active operation. In a passive tag configuration, the NFC tag 120 may be powered by radio signals of a device in communication with the NFC tag 120 (e.g., by radio signals from the communication device 105). For example, a coil in the device antenna 220 may inductively couple with a coil of the tag antenna 310 and may be driven (e.g., with alternating current) to wirelessly transmit power through the inductive coupling to the tag antenna 310. The NFC tag 120 may, in turn, harvest or collect the wirelessly transmitted power and apply the power to circuitry of the NFC tag 120 for operation (e.g., to the tag electronic processor 300, the tag memory 305). In some examples, the NFC tag 120 may have a temporary charge storage element (e.g., a capacitor) that collects the wirelessly transmitted power for application to the other circuitry of the NFC tag 120 on a short-term basis (e.g., during the duration of a communication between the NFC tag 120 and the communication device 105). For example, the NFC tag 120 may be wirelessly powered by the communication device 105 while the communication device 105 sends a request signal to the NFC tag 120 and while the communication device 105 receives a response signal to the request signal from the NFC tag 120. In an active (powered) tag configuration, the NFC tag 120 may have a battery, coin cell, or other local power source on-board the NFC tag 120 to power the circuitry of the NFC tag 120. In a hybrid tag configuration, the NFC tag 120 may have a local power source but may also be able to harvest wirelessly transmitted power from the communication device 105 (e.g., for charging the power supply and/or directly powering the circuitry of the NFC tag 120).

Returning to FIG. 1, the system 100 may include the database 115. Although not illustrated in FIG. 1, the database 115 may include similar components as the communication device 105, such as electronic processor (for example, a microprocessor, an ASIC, or another suitable electronic device), a memory (for example, a non-transitory, computer-readable storage medium), a communication interface, such as a transceiver, for communicating over the communication network 130 and, optionally, one or more additional communication networks or connections, and one or more HMIs.

As illustrated in FIG. 1, the database 115 may include customer data 150. The customer data 150 may include various data types or formats. The customer data 150 may include one or more customer accounts or profiles, where each customer account may be specific to a particular user or account. The customer data 150 may include information or data related to a customer account status, a subscription status, a payment status, a billing status, etc. As noted herein, in some configurations, the system 100 may include multiple databases 115. In such configurations, the system 100 may include a database for each type or category of customer data. As one example, the system 100 may include a customer account database, a subscription database, a payment database, a billing database, etc., where each database includes information or data related to a particular user's customer account status, subscription status, payment status, billing status, etc. As such, in some configurations, customer data for a particular user may be retrieved or otherwise accessed from multiple storage locations or devices (e.g., multiple databases 115).

The system 100 may include the server 110. The server 110 may be a computing device. In some configurations, the server 110 may be a carrier server such that a carrier maintains or manages the server 110.

Figure 4:
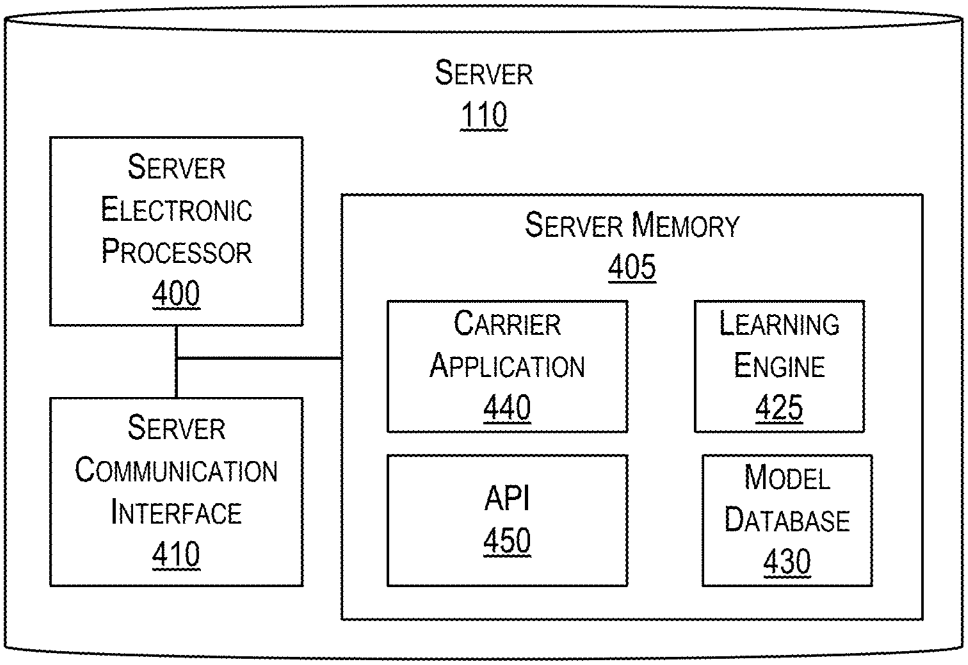
FIG. 4 schematically illustrates a server included in the system of FIG. 1 in accordance with some configurations.

FIG. 4 illustrates an example server 110 according to some configurations. As illustrated in FIG. 4, the server 110 may include a server electronic processor 400, a server memory 405, and a server communication interface 410.

The server electronic processor 400, the server memory 405, and the server communication interface 410 may communicate wirelessly, over one or more communication lines or buses, or a combination thereof. The server 110 may include additional, different, or fewer components than those illustrated in FIG. 4 in various configurations. The server 110 may perform additional or different functionality than the functionality described herein. Also, the functionality (or a portion thereof) described herein as being performed by the server 110 may be performed by another component (e.g., the communication device 105, another component of the system 100, or a combination thereof), distributed among multiple devices (e.g., as part of a cloud service or cloud-computing environment), combined with another component (e.g., the communication device 105, another component of the system 100, or a combination thereof), or a combination thereof.

The server communication interface 410 may include a transceiver that communicates with the communication device 105, the database 115, the NFC tag 120, or a combination thereof over the communication network 130 and, optionally, one or more other communication networks or connections. The server electronic processor 400 includes one or more processors (e.g., one or more microprocessors, one or more application-specific integrated circuits ("ASICs"), and/or one or more other suitable electronic device for processing data), and the server memory 405 includes a non-transitory, computer-readable storage medium. The server electronic processor 400 is configured to retrieve instructions and data from the server memory 405 and execute the instructions.

As illustrated in FIG. 4, the server memory 405 may store a learning engine 425 and a model database 430. In some configurations, the learning engine 425 develops one or more models using one or more machine learning functions. Machine learning functions are generally functions that allow a computer application to learn without being explicitly programmed. In particular, the learning engine 425 is configured to develop an algorithm or model based on training data. As one example, to perform supervised learning, the training data includes example inputs and corresponding desired (for example, actual) outputs, and the learning engine 425 progressively develops a model that maps inputs to the outputs included in the training data. As another example, to perform self-supervised learning ("SSL"), a model is trained on a task using the data itself to generate supervisory signals (e.g., unlabeled training data), rather than relying on, e.g., external labels provided by a user (e.g., labeled training data). As yet another example, to perform semi-supervised learning, the training data may include desired output values for a subset of the training data (e.g., labeled training data) while the remaining training data may be unlabeled or imprecisely labeled (e.g., unlabeled training data). Machine learning performed by the learning engine 425 may be performed using various types of methods and mechanisms including but not limited to decision tree learning, association rule learning, artificial neural networks, inductive logic programming, support vector machines, clustering, Bayesian networks, reinforcement learning, representation learning, similarity and metric learning, sparse dictionary learning, and genetic algorithms. These approaches allow the learning engine 425 to ingest, parse, and understand data and progressively refine models.

Models generated by the learning engine 425 can be stored in the model database 430. As illustrated in FIG. 4, the model database 430 may be included in the server memory 405. It should be understood, however, that, in some configurations, the model database 430 may be included in one or more separate devices accessible by the server 110 of FIG. 4 (including a remote database, and the like).

As illustrated in FIG. 4, the server memory 405 may include a carrier application 440. The carrier application 440 is a software application executable by the server electronic processor 400 in the example illustrated and as specifically discussed below, although a similarly purposed module can be implemented in other ways in other examples. In some configurations, the carrier application 440 may be a dedicated software application locally stored in the server memory 405 of the server 110. As described in greater detail herein, the carrier application 440 (when executed by the server electronic processor 400) may enable or facilitate communication device servicing.

In some examples, the carrier application 440 may utilize one or more models stored in the model database 430 as part of facilitating communication device servicing. As such, in some configurations, the carrier application 440 may access relevant data for a particular communication device 105 (as described in greater detail herein), access a recommendation model (e.g., a model stored in the model database 430), and apply the recommendation model to the relevant data in order to determine (as an output of the model) one or more recommended operations to be performed with respect to the communication device 105.

As illustrated in FIG. 4, the server memory 405 may include an application programming interface (API) 450. The API 450 is a software application executable by the server electronic processor 400 in the example illustrated and as specifically discussed below, although a similarly purposed module can be implemented in other ways in other examples. In some configurations, the API 450 may be a dedicated software application locally stored in the server memory 405 of the server 110. As described in greater detail herein, the API 450 (when executed by the server electronic processor 400) may enable or facilitate communication device servicing. For instance, in some configurations, the API 450 may handle API calls, including, e.g., receiving requests, querying database(s), receiving data from the queried database(s), and transmitting a response with the received data.

In some examples, the carrier application 440 may utilize the API 450 as part of facilitating communication device servicing, as described herein. As one example, the carrier application 440 (e.g., the server 110) may receive an API call from the communication device 105. Responsive to receiving the API call, the carrier application 440 may invoke (or otherwise interact) with the API 450, such that the API 450 handles the API calls received from the communication device 105. Alternatively, in some configurations, the API 450 receives the API calls directly. As described in greater detail herein, in some configurations, the API 450 may communicate with the database 115 to request and retrieve at least a portion of customer data 150 (e.g., via one or more database queries). The data retrieved from the database 115 may then be utilized by the carrier application 440 (or the API 450) to determine one or more recommended operations for the communication device 105 (using data specific to the communication device 105, a user of the communication device 105, an account of the communication device 105, etc.).

The server memory 405 may include additional, different, or fewer components in different configurations. Alternatively, or in addition, in some configurations, one or more components of the server memory 405 may be combined into a single component, distributed among multiple components, or the like. Alternatively, or in addition, in some configurations, one or more components of the server memory 405 may be stored remotely from the server 110, or, in a remote database, another server, a remote user device, an external storage device, or the like (e.g., the database 115, the communication device 105, etc.).

Figure 5:
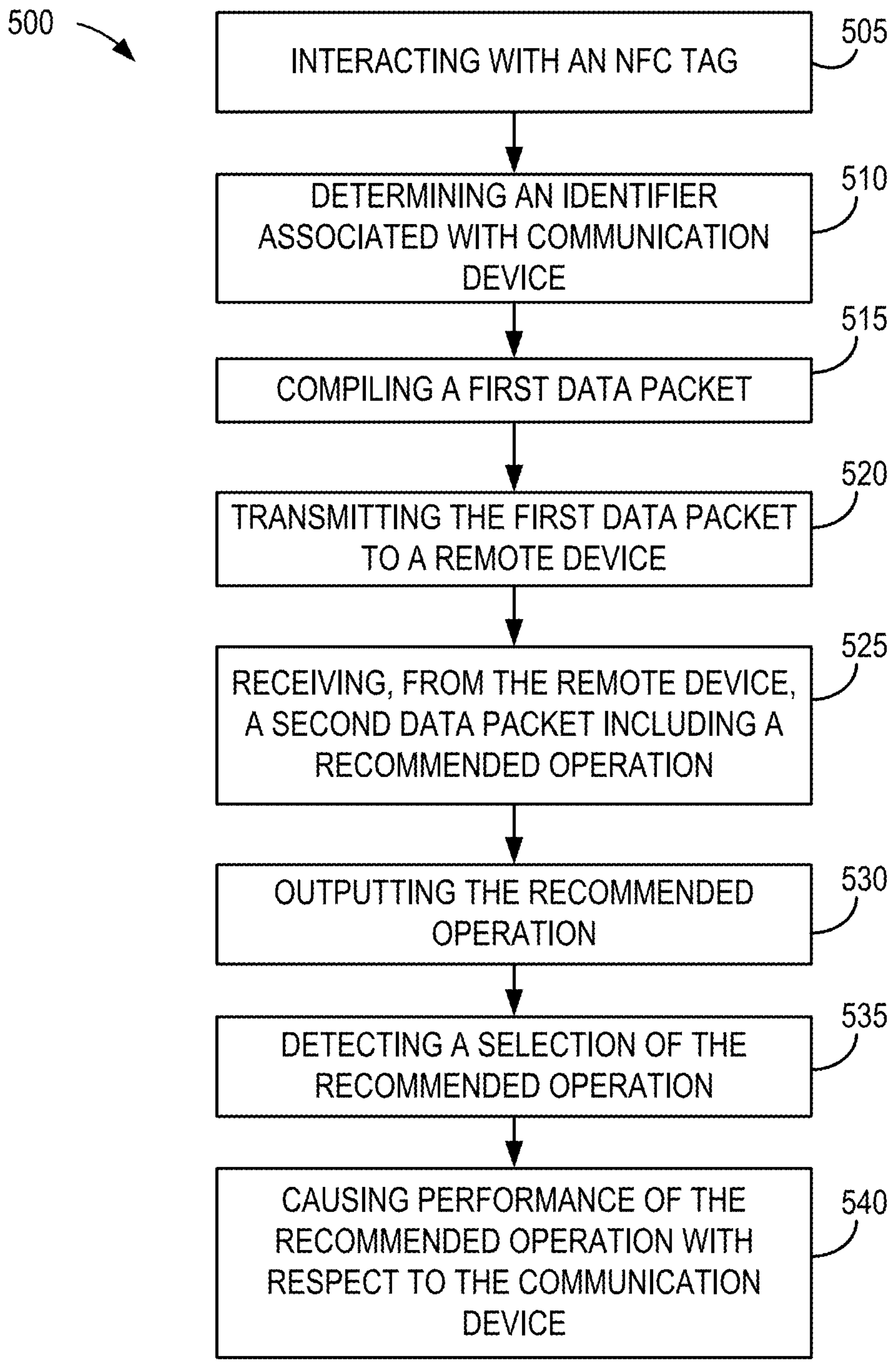
FIG. 5 is a flowchart of an example method for implementing NFC for communication device servicing according to some configurations.

FIG. 5 illustrates a flowchart of an example method 500 for implementing NFC for communication device servicing according to some configurations. The method 500 is described as being performed by the communication device 105 and, in particular, the application 240 as executed by the device electronic processor 200. However, as noted above, the functionality described with respect to the method 500 may be performed by other devices, such as, e.g., the server 110, or distributed among a plurality of devices, such as a plurality of servers included in a cloud service.

As illustrated in FIG. 5, the method 500 may include interacting with the NFC tag 120 (at block 505). For instance, in some configurations, the communication device 105 may scan (or otherwise initiate communication with) the NFC tag 120. In some examples, the device electronic processor 200 may initiate communication with the NFC tag 120. For instance, the device electronic processor 200 may output, via the device antenna 220, a request signal (e.g., a request RF signal or a request NFC signal) to the NFC tag 120. The NFC tag 120, via the tag antenna 310, may receive the request signal. Responsive to the request signal, the NFC tag 120 (e.g., the tag electronic processor 300) may generate a response signal that responds to the request signal (e.g., a response RF signal or a response NFC signal). The tag electronic processor 300 may embed data from the tag memory 305 in the response signal, including, e.g., the instruction(s) 340, the identifier(s) 225, etc. Accordingly, in some configurations, the response signal includes the instruction(s) 340, the identifier(s) 225, etc. The tag electronic processor 300 may output, via the tag antenna 310, the response signal to the communication device 105. The device electronic processor 200 may receive, via the device antenna 220, the response signal.

As described herein, in some configurations, the instruction(s) 340 may include instructions for facilitating communication device servicing. Alternatively, or in addition, in some configurations, the instructions for facilitating communication device servicing as described herein may be stored in the device memory 205. In such configurations, the instruction(s) 340 (or other embedded data of the response signal) may function as a trigger or prompt to execute the locally stored instructions for facilitating communication device servicing.

As such, in some configurations, the interaction between the NFC tag 120 and the communication device 105 (e.g., receipt of the response signal at the communication device 105) may initiate or trigger execution of a communication device servicing process or functionality. For instance, as a result of the interaction between the NFC tag 120 and the communication device 105, the device electronic processor 200 may receive (or otherwise access) instructions (e.g., the instruction(s) 340) to initiate a communication device servicing process as described herein. In some configurations, the device electronic processor 200 may launch the application 240 responsive to the interaction between the NFC tag 120 and the communication device 105. In some examples, the device electronic processor 200 may automatically launch the application 240 without user input requesting launch of the application 240 (e.g., without a user interaction with the communication device 105 to actively launch the application 240). For example, the device electronic processor 200 may (automatically) launch the application 240 responsive to the response signal received from the NFC tag 120.

The device electronic processor 200 may determine an identifier (e.g., the identifier(s) 225) associated with the communication device 105 (at block 510). In some configurations, the identifier(s) 225 may be stored in the device memory 205, the tag memory 305, or a combination thereof. Accordingly, in some configurations, the device electronic processor 200 may determine the identifier(s) 225 by accessing the identifier(s) 225 from the device memory 205. Alternatively, or in addition, in some configurations, when the response signal received from the NFC tag 120 includes the identifier(s) 225, the device electronic processor 200 may determine the identifier(s) 225 based on the response signal received from the NFC tag 120. For instance, the device electronic processor 200 may extract (or otherwise obtain) the identifier(s) 225 from the response signal.

The device electronic processor 200 may compile a data packet (at block 515). In some configurations, the device electronic processor 200 may compile the data packet responsive to receipt of the response signal (e.g., the interaction at block 505). The data packet may include the identifier(s) 225 (e.g., as determined at block 510). In some configurations, the data packet may include or otherwise be a request for one or more recommended operations to be performed with respect to the communication device 105. A recommended operation may include, e.g., activation or provision of the communication device 105 or a component thereof (e.g., a subscriber identity module (SIM) card, an electronic SIM (eSIM) card, etc.), initiating and completing payment of a carrier service statement or invoice, requesting a customer service call back, placing a call directly to a customer service representative or entity, activating a service for the communication device 105, selecting and subscribing for additional service or functionality (e.g., an add-on function or service for the communication device 105), etc.

In some configurations, the data packet may include an identifier of the NFC tag 120 and an identifier of the communication device 105 (e.g., as the identifiers 225). In such configurations, the device electronic processor 200 may compile the data packet to include both the identifier of the NFC tag 120 and the identifier of the communication device 105. In some examples, the device electronic processor 200 may compile the data packet to include both identifiers as part of a setup process for the communication device 105, as part of an authentication process (e.g., when re-identifying or re-authenticating a customer or user of the communication device 105), as part of a device change or device upgrade process (e.g., when a customer changes or upgrades from a first communication device to a second different communication device).

The device electronic processor 200 may transmit the data packet (or request thereof) to a remote device, such as, e.g., the server 110 (at block 520). In some configurations, the data packet (or request thereof) may be transmitted to the server 110 as an API call to the API 450. In such configurations, the API 450 may handle the data packet (or request thereof) and generate a response data packet responsive to the data packet (or request thereof), as described in greater detail herein.

In some configurations, the device electronic processor 200 may receive, from the remote device (e.g., the server 110), a response (or second) data packet (at block 525). The response data packet may include one or more recommended operations specific to the communication device 105 (e.g., recommended operation(s) determined based on data relevant to the communication device 105, a user of the communication device 105, an account associated with the communication device 105, etc.).

Responsive to receiving the response data packet, including, e.g., the recommended operation(s), the device electronic processor 200 may output the recommended operation(s) (at block 530). In some configurations, the device electronic processor 200 may output the recommended operation(s) using the application 240 of the communication device 105 such that, e.g., the recommended operation(s) are displayed to a user (e.g., via the display device 245 of the communication device 105).

Figure 6:
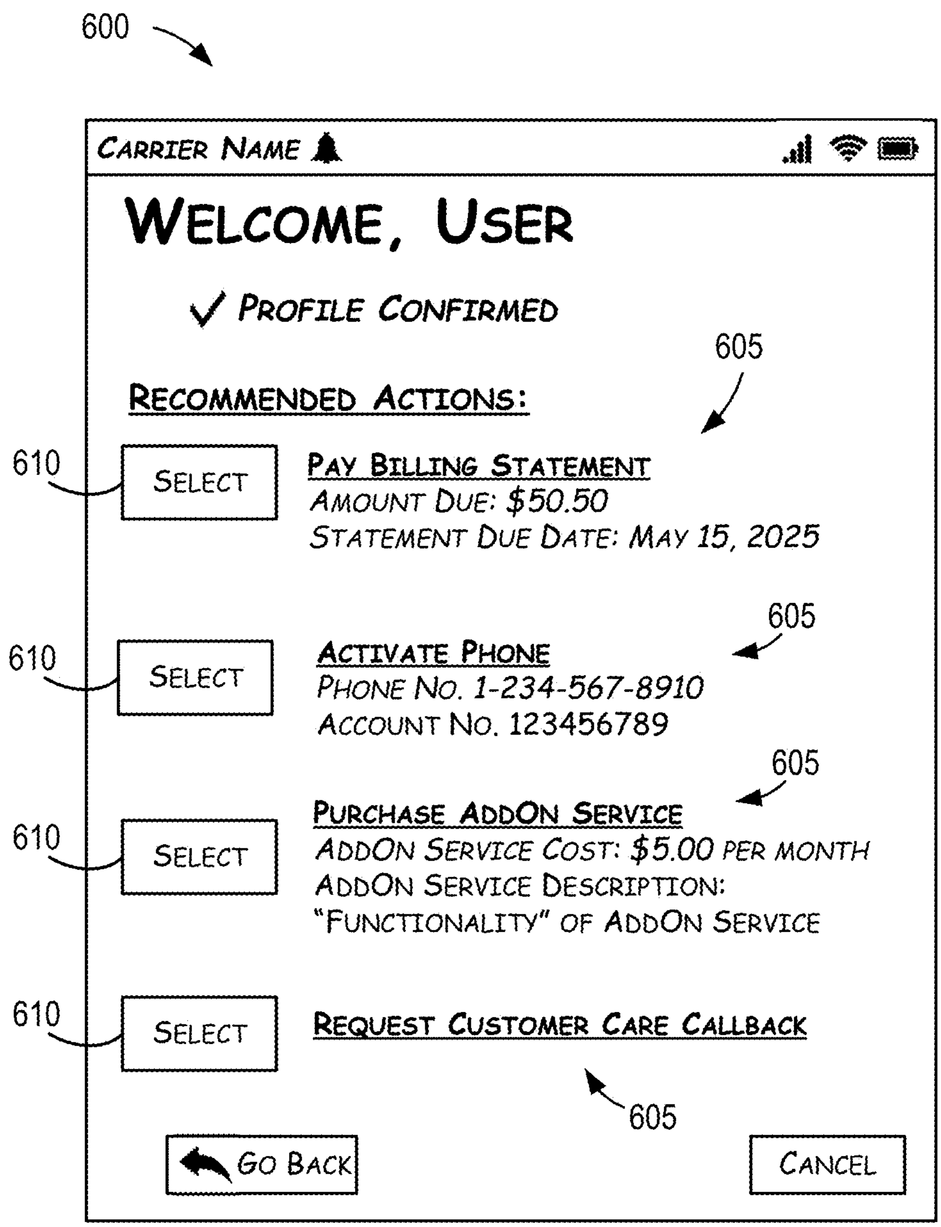
FIG. 6 is an example user interface according to some configurations.

For instance, in some configurations, the device electronic processor 200 may generate a user interface ("UI") for display via the application 240. The UI may include, e.g., a graphical user interface, a natural user interface, etc. The device electronic processor 200 may generate the UI based on the data packet. FIG. 6 illustrates an example UI 600 according to some configurations. As illustrated in FIG. 6, the UI 600 may include the recommended operation(s) (represented in FIG. 6 by reference numeral 605). As also illustrated in FIG. 6, the UI 600 may include one or more interactive control components 610. The interactive control component(s) 610 may be configured to receive a user interaction, such as, e.g., a selection of a corresponding recommended operation. For example, a user may select a recommended operation 605 by selecting (or otherwise interacting with) a corresponding interactive control component 610 of the UI 600.

After outputting the recommended operation(s) (e.g., at block 530), the device electronic processor 200 may detect a selection of a recommended operation (at block 535). In some configurations, the device electronic processor 200 may detect the selection based on an interaction with the application 240 of the communication device 105 (e.g., the UI 600 of FIG. 6). For instance, as noted above with respect to the example UI 600 of FIG. 6, a recommended operation 605 may have a corresponding interactive control component 610. As such, the device electronic processor 200 may detect the selection based on a user interacting with one of the interactive control components 610 of the UI 600 (e.g., a user clicking on an interactive control component 610).

In some configurations, responsive to detecting the selection of the recommended operation (e.g., at block 535), the device electronic processor 200 may cause (or otherwise trigger) performance of the recommended operation with respect to the communication device 105. For instance, in some configurations, the device electronic processor 200 may execute or perform the recommended operation with respect to the communication device 105 locally. Alternatively, or in addition, the device electronic processor 200 may trigger performance of the recommended operation with respect to the communication device 105 by a remote device, such as, e.g., the server 110. For instance, in some configurations, the device electronic processor 200 may generate and transmit a notification of the selection to a remote device (e.g., the server 110), which causes the remote device (e.g., the server 110) to execute (or otherwise perform) the selected recommended operation.

Figure 7:
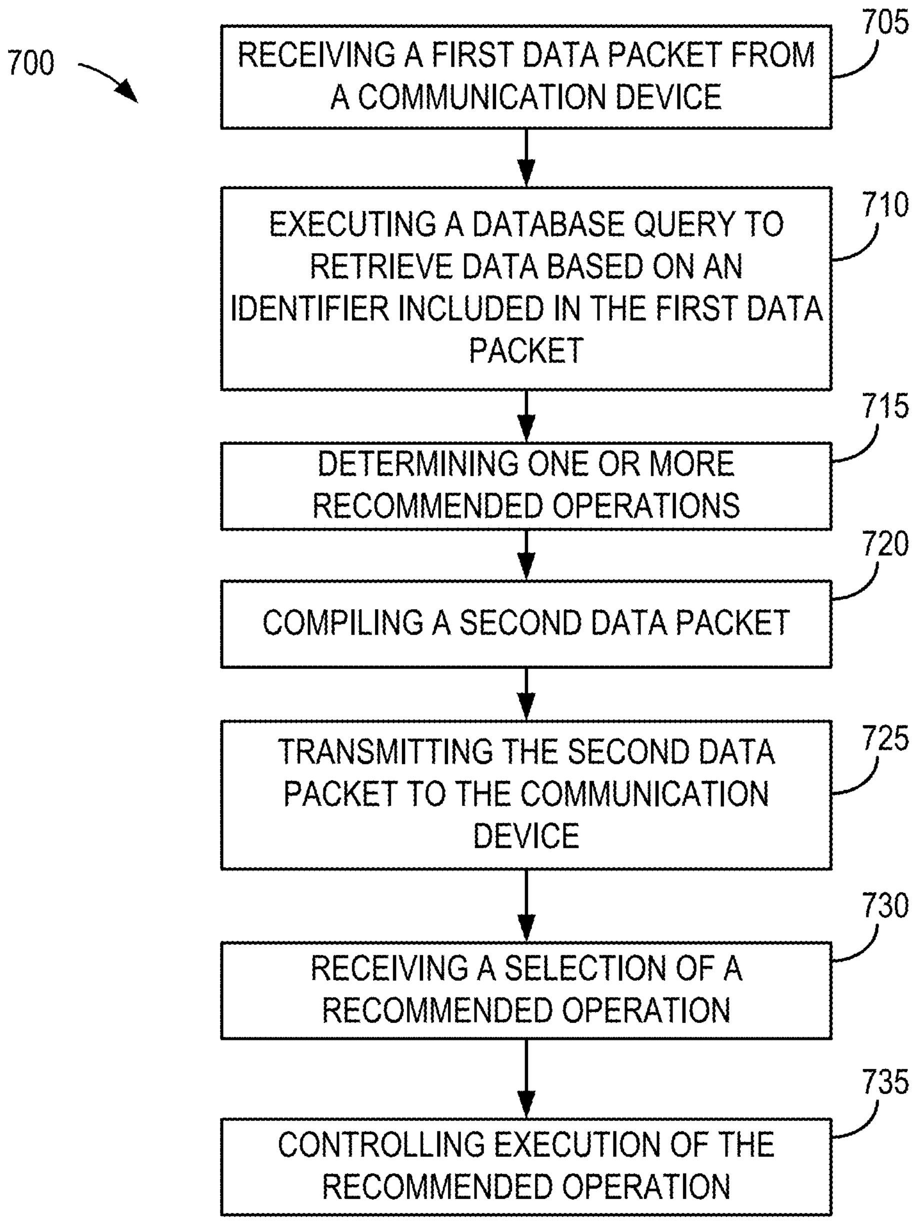
FIG. 7 is a flowchart of another example method for implementing NFC for communication device servicing according to some configurations.

FIG. 7 illustrates a flowchart of an example method 700 for implementing NFC for communication device servicing according to some configurations. The method 700 is described as being performed by the server 110 and, in particular, the carrier application 440 (including, e.g., the API 450) as executed by the server electronic processor 400. However, as noted above, the functionality described with respect to the method 700 may be performed by other devices, such as, e.g., the communication device 105, or distributed among a plurality of devices, such as a plurality of servers included in a cloud service.

As illustrated in FIG. 7, the method 700 may include receiving, from the communication device 105, the first data packet generated (e.g., in block 515 of FIG. 5) responsive to an interaction between the communication device 105 and the NFC tag 120 (e.g., in block 505 of FIG. 5) (at block 705).

In some configurations, responsive to receipt of the first data packet (e.g., at block 705), the server 110 (e.g., the server electronic processor 400) may execute a database query to retrieve data based on the identifier(s) 225 included in the first data packet (at block 710). In some configurations, the server 110 may execute the database query with respect to the database 115 to retrieve at least a portion of the customer data 150 stored therein. In some configurations, the server 110 may determine relevant customer data 150 related to the communication device 105 based on the identifier(s) 225 included in the data packet. For instance, from the identifier(s) 225, the server 110 may determine identifying information, such as, e.g., identify the communication device 105, an account associated with the communication device 105, a user of the communication device 105, etc. Based on the identifying information, the server 110 may execute a database query with respect to the database 115, where the database query is for customer data 150 related to or associated with the identifying information (e.g., customer data 150 for a particular communication device 105, a particular user of the communication device 105, a particular account associated with the communication device 105, etc.). Responsive to the database query, the database 115 may access (or otherwise retrieve) and provide, to the server 110, the data (e.g., the relevant data) requested by the server 110.

After receiving (or otherwise accessing) the relevant data (e.g., at block 710), the server electronic processor 400 may determine one or more recommended operations for the communication device 105 (at block 715). In some configurations, the server electronic processor 400 may determine the recommended operation(s) based on the data retrieved by execution of the database query (e.g., at block 710).

In some configurations, the server electronic processor 400 may access one or more models (or recommendation model(s)) stored in the model database 430 and apply the model(s) to the data retrieved by execution of the database query. For instance, in some configurations, the server electronic processor 400 may access and apply a recommendation model to the data retrieved by execution of the database query in order to determine the recommended operation(s) for the communication device 105, where the recommendation model may be trained using machine learning with training data to recommend operations for specific communication devices based on data associated with a corresponding identifier.

After determining the recommended operation(s) specific to the communication device 105 (e.g., at block 715), the server electronic processor 400 may compile a second data packet (at block 720) and transmit the second data packet to the communication device 105 (at block 725). The second data packet may include, e.g., the recommended operation(s) for the communication device 105. As described with respect to block 525 of FIG. 5, the communication device 105 may receive the second data packet from the server 110.

The server electronic processor 400 may receive a notification or selection of a recommended operation (at block 730). For instance, as described with respect to block 535 of FIG. 5, the communication device 105 may detect a selection of the recommended operation, and, in some configurations, the communication device 105 may generate and transmit a notification of the selection to the server 110.

Responsive to receiving the selection (e.g., at block 730), the server electronic processor 400 may control execution of the recommended operation with respect to the communication device 105 (at block 735). In some examples, the server electronic processor 400 may control execution of the recommended operation with respect to the communication device 105 by activating a SIM card (or eSIM) of the communication device 105, activating an add-on function for the communication device 105, facilitating a service call for the communication device 105, etc.

Figure 8:
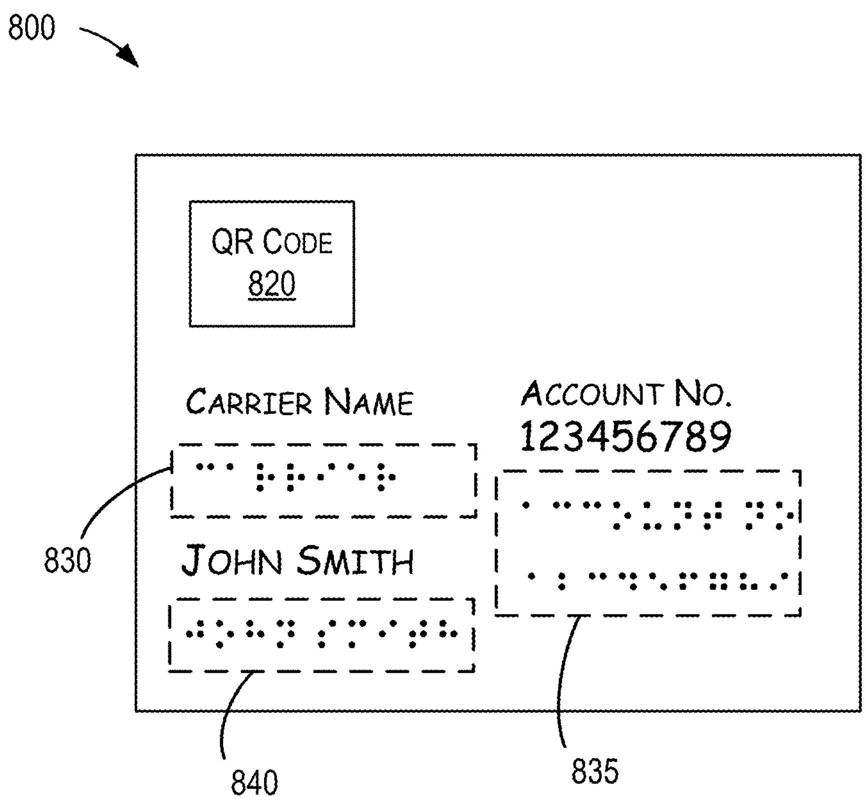
FIG. 8 is an example NFC tag having braille support according to some configurations.

FIG. 8 illustrates an example NFC tag 800 with braille support according to some configurations. The NFC tag 800 may be an example of the NFC tag 120, which includes additional features. For example, as illustrated in FIG. 8, the NFC tag 800 may include a quick-response ("QR") code 820. The QR code 820 may include the data to be provided by the NFC tag 800 to the communication device 105, as described herein with respect to block 505 of FIG. 5. For instance, an interaction between the NFC tag 800 and the communication device 105 may include an imaging device (e.g., a camera) of the communication device 105 capturing image data associated with the QR code 820. Accordingly, the communication device 105 may interact with the NFC tag 800 via NFC communications (e.g., as described with respect to FIG. 5), and/or via an imaging device and the QR code 820 (e.g., depending on user preference). In other examples, the NFC tag 800 is implemented as a QR tag without electronics of FIG. 3 for NFC communication.

As also illustrated in the example of FIG. 8, the NFC tag 800 may provide braille support by, e.g., including braille translations of information included on the NFC tag 800. For instance, a first braille translation 830 may correspond to a carrier name, a second braille translation 835 may correspond to an account number, and third braille translation 840 may correspond to a user's name.

In some examples, aspects of the technology, including computerized implementations of methods according to the technology, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, examples of the technology can be implemented as a set of instructions, tangibly embodied on a non-transitory computer-readable media, such that a processor device can implement the instructions based upon reading the instructions from the computer-readable media. Some examples of the technology can include (or utilize) a control device such as an automation device, a special purpose or general-purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

Certain operations of methods according to the technology, or of systems executing those methods, can be represented schematically in the FIGS. or otherwise discussed herein. Unless otherwise specified or limited, representation in the FIGS. of particular operations in particular spatial order can not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular examples of the technology. Further, in some examples, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) can reside within a process or thread of execution, can be localized on one computer, can be distributed between two or more computers or other processor devices, or can be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as "either," "one of," "only one of," or "exactly one of."

Although the present technology has been described by referring to preferred examples, those skilled in the art will recognize that changes can be made in form and detail without departing from the scope of the discussion.

What is claimed is:

1. A communication device, comprising:

a reader having an antenna; and one or more electronic processors in communication with the antenna of the reader, the one or more electronic processors configured to:

output, via the antenna, a request radio frequency (RF) signal to an external near-field communication (NFC) tag;

receive, via the antenna, a response RF signal from the external NFC tag responsive to the request RF signal, the response RF signal including data embedded on the NFC tag;

responsive to receipt of the response RF signal, determine an identifier associated with the communication device; and generate and transmit a request to a remote device, the request including the identifier associated with the communication device;

receive, from the remote device, a data packet responsive to the request, the data packet including a first recommended operation for the communication device;

output, via a display device of the communication device, the first recommended operation;

detect a selection of the first recommended operation; and responsive to the selection, cause the remote device to execute the first recommended operation.

2. The communication device of claim 1, wherein the one or more electronic processors are configured to generate and transmit a notification of the selection to the remote device causing the remote device to execute the first recommended operation.

3. The communication device of claim 1, wherein the one or more electronic processors are configured to generate, based on the data packet, a user interface (UI), the UI including an interactive control component configured to receive the selection of the first recommended operation.

4. The communication device of claim 3, wherein the one or more electronic processors are configured to launch an application stored on the communication device, wherein the first recommended operation is output via the application.

5. The communication device of claim 4, wherein the one or more electronic processors are configured to, responsive to receipt of the response RF signal and the data packet, launch the application without user input requesting launch of the application.

6. The communication device of claim 1, wherein the one or more electronic processors are configured to access the identifier from a memory of the communication device.

7. The communication device of claim 1, wherein the one or more electronic processors are configured to determine the identifier based on the response RF signal, wherein the identifier is stored by the NFC tag and is included in the response RF signal.

8. The communication device of claim 1, wherein the request is an application programming interface (API) call to an API of the remote device, wherein the data packet is received from the API responsive to the request.

9. A system, comprising:

a near-field communication (NFC) tag including a first antenna configured to facilitate short-range wireless communication; and a communication device, comprising:

a second antenna configured to engage in short-range wireless communication with the first antenna of the NFC tag; and one or more electronic processors in communication with the second antenna and configured to:

receive, via the second antenna, an NFC signal from the NFC tag;

responsive to receipt of the NFC signal, compile a first data packet including an identifier associated with the communication device and a request for one or more recommended operations to be performed with respect to the communication device;

transmit the first data packet to a remote device;

receive, from the remote device, a second data packet including a plurality of recommended operations to be performed with respect to the communication device;

output, using an application of the communication device, the plurality of recommended operations to a user via a display device of the communication device;

detect, based on an interaction with the application of the communication device, a selection of a recommended operation of the plurality of recommended operations; and responsive to detecting the selection of the recommended operation, cause performance of the recommended operation with respect to the communication device.

10. The system of claim 9, wherein the NFC tag includes a memory configured to store a set of instructions to launch an application on the communication device to facilitate servicing of the communication device.

11. The system of claim 10, wherein the first antenna is configured to:

receive, from the second antenna of the communication device, a first NFC signal; and transmit, to the second antenna of the communication device, a second NFC signal responsive to the first NFC signal, the second NFC signal including the set of instructions.

12. The system of claim 11, wherein the memory includes the identifier and the second NFC signal includes the identifier.

13. The system of claim 9, wherein the one or more electronic processors are configured to:

generate a user interface (UI) for the application, the UI including the plurality of recommended operations and a set of interactive components, wherein each interactive component of the set of interactive components corresponds to one of the plurality of recommended operations; and detect the selection of the recommended operation based on an interaction with an interactive component corresponding to the recommended operation, wherein, to output the plurality of recommended operations, the one or more electronic processors are configured to output the UI.

14. The system of claim 9, wherein the one or more electronic processors are configured to:

responsive to the NFC signal, launch the application without user input requesting launch of the application.

15. The system of claim 9, wherein the one or more electronic processors are configured to locally perform the recommended operation with respect to the communication device.

16. A method, comprising:

receiving, with one or more electronic processors, from a communication device, a first data packet generated responsive to an interaction between the communication device and a near-field communication (NFC) tag, the first data packet including an identifier and a request for a plurality of recommended operations for the communication device;

executing, with the one or more electronic processors, a database query to retrieve data based on the identifier included in the first data packet;

determining, with the one or more electronic processors, the plurality of recommended operations for the communication device based on the data retrieved by execution of the database query;

compiling, with the one or more electronic processors, a second data packet, the second data packet including the plurality of recommended operations for the communication device;

transmitting, with the one or more electronic processors, the second data packet to the communication device;

receiving, with the one or more electronic processors, a selection of a recommended operation of the plurality of recommended operations; and responsive to receiving the selection, controlling, with the one or more electronic processors, execution of the recommended operation with respect to the communication device.

17. The method of claim 16, wherein executing, with the one or more electronic processors, the database query to retrieve the data based on the identifier included in the first data packet includes:

determining, with the one or more electronic processors, relevant data related to the communication device based on the identifier included in the first data packet; and executing, with the one or more electronic processors, the database query to retrieve the relevant data.

18. The method of claim 16, wherein determining, with the one or more electronic processors, the plurality of recommended operations for the communication device based on the data retrieved by execution of the database query includes applying, with the one or more electronic processors, a recommendation model to the data retrieved by execution of the database query to determine the plurality of recommended operations for the communication device, wherein the recommendation model is trained using machine learning with training data to recommend operations for specific communication devices based on data associated with a corresponding identifier.

19. The method of claim 16, wherein controlling, with the one or more electronic processors, execution of the recommended operation with respect to the communication device includes activating a subscriber identity module (SIM) card or electronic SIM (eSIM) of the communication device.

20. The method of claim 16, wherein controlling, with the one or more electronic processors, execution of the recommended operation with respect to the communication device includes at least one of activating an add-on function for the communication device or facilitating a service call for the communication device.

* * * * *